Jan. 17, 1928.

H. BOWLES

BUILDING TILE

Filed July 11, 1925

INVENTOR.
Hardy Bowles
BY Marshall & Hawley
ATTORNEYS.

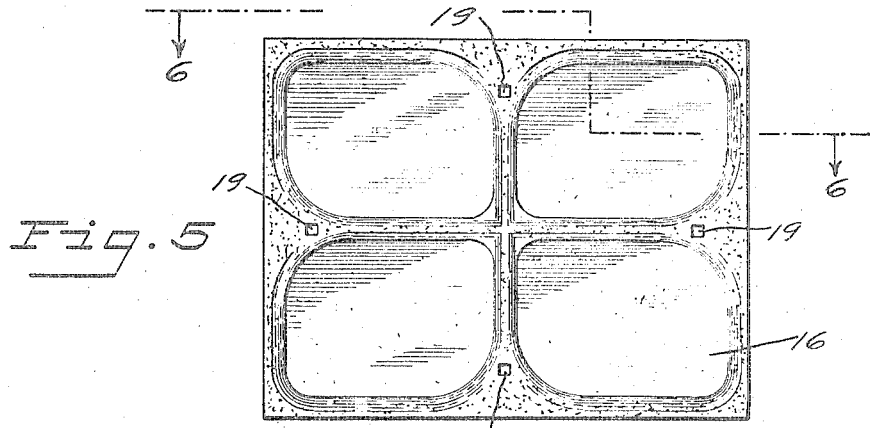
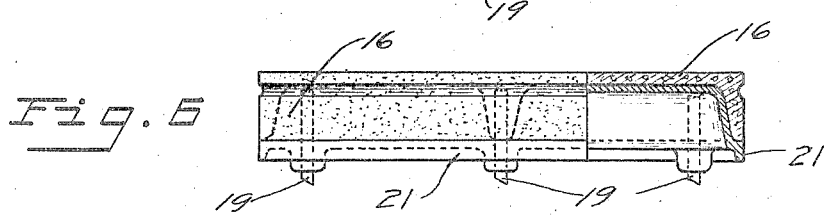
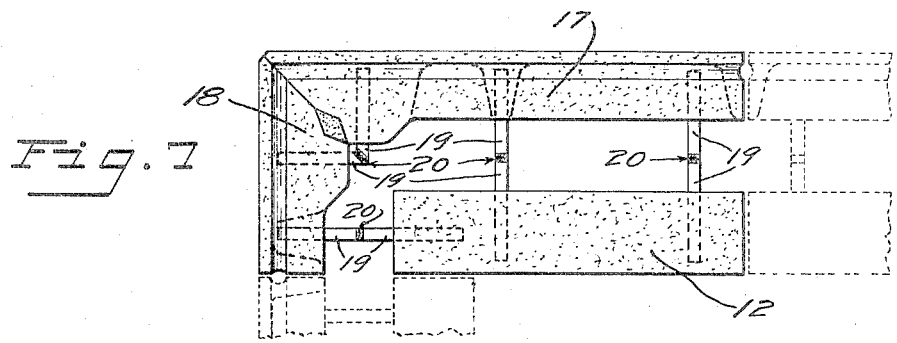
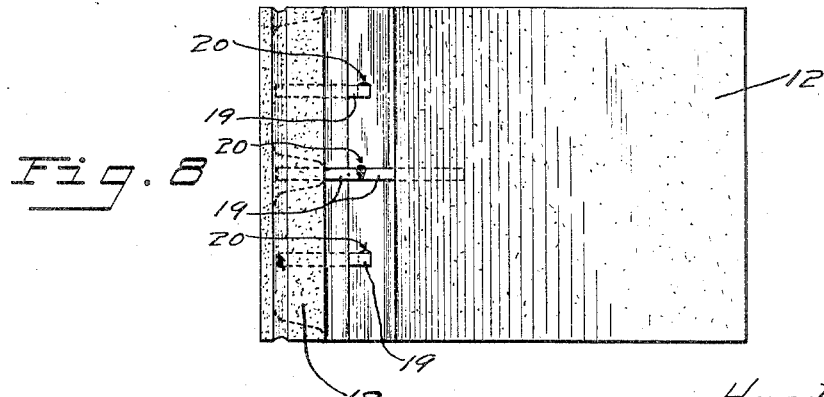

Jan. 17, 1928.
H. BOWLES
BUILDING TILE
Filed July 11, 1925    3 Sheets-Sheet 3
1,656,163
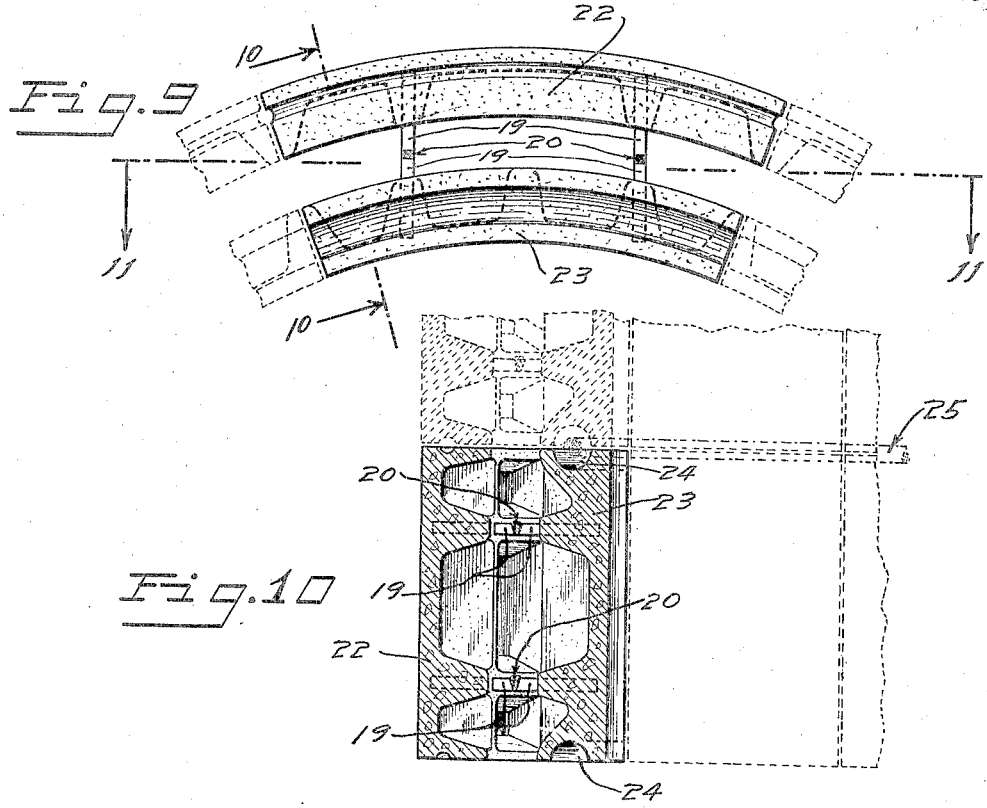
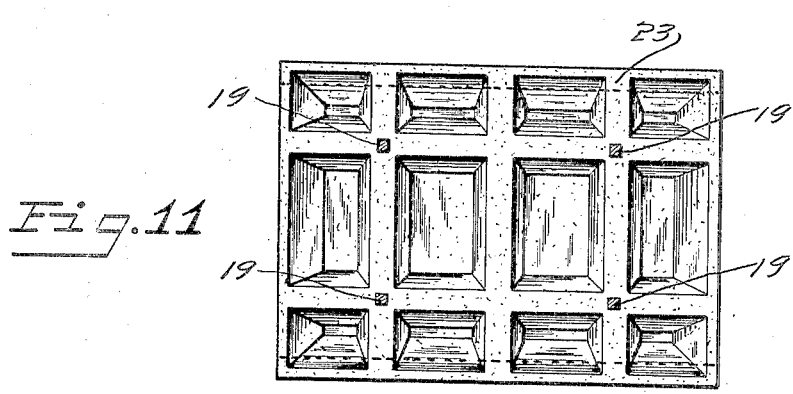
INVENTOR.
Hardy Bowles
BY Marshall & Hawley
ATTORNEYS.

Patented Jan. 17, 1928.

1,656,163

UNITED STATES PATENT OFFICE.

HARDY BOWLES, OF SHREVEPORT, LOUISIANA.

BUILDING TILE.

Application filed July 11, 1925. Serial No. 42,942.

This invention relates to unitary building tile with continuous air-spaces and to methods for making the same, and its objects are to provide an improved hollow wall tile for building construction and a simple and practical method of producing from a plastic material, a rigid hollow-wall tile of uniform accuracy and of minimum weight, regardless of the width or the surface area of the tile. By the method herein described, the slabs composing the completed tile may be made as thin and light as desired and of any desirable surface area, inasmuch as they are poured on prostrate beds and remain in a prone position until they have hardened, thereby avoiding the necessity of handling the slabs while the material is in a plastic or green state and thus eliminating the possibility of distortion or warping. By providing the inner opposing faces of the slabs with tie-rod bosses, the slabs may be made of uniform thickness and weight for all widths of tile, so that the increase in the weight of the tile as the width increases, is due solely to the increased length of the tie-rods and the extension of the tie-rod bosses. By providing said inner faces with continuous marginal flanges and transverse strengthening ribs, wide mortar beds and structural strength are secured with a minimum of material. The foregoing objects are very desirable results to be obtained in the manufacture of light weight non-bearing tile.

The method of making the tile is to mold and cure separately and in a prone position the several component parts or sections of the unit with metal bars embedded therein and projecting therefrom at correspondingly located parts of the sections. When the sections have hardened sufficiently to be removed from their beds or pallets, the several component parts of the unit are subsequently assembled in desired spaced relation and formed into a unitary hollow-wall tile by merging the corresponding metal bars into continuous permanent connections, as by soldering, brazing, fusing or electric welding, thus producing a rigid, self-contained unitary hollow wall tile, ready to be delivered on the job so that the construction of a wall is a simple and practical matter.

One purpose of the invention is to provide a light weight large area tile for the construction of non-bearing walls, and light sound-proof partitions, in combination with reinforced concrete skeleton frame structures.

Another purpose of the invention is to provide a light weight, economical tile for fire-proof flat-arch floor construction, in combination with reinforced concrete beams and girders. The principal advantage of a cement tile for this purpose, is that the tile has the same coefficient of expansion as the supporting members and is therefore not affected by extreme and sudden changes in temperature, it will not buckle and crack as the rate of expansion and contraction is the same as that of the beams and girders.

Another purpose of the invention is to provide an economical substitute for wood or steel forms in the construction of reinforced concrete beams, girders and solid walls.

Another purpose of the invention is to provide an inexpensive tile for the construction of hollow damp-proof ground floors.

Referring to the drawings:—

Fig. 5 is an elevation view showing the inner face of a member, another modification of said tile showing a different arrangement of the marginal flanges, ribs and tie-rods.

Fig. 6 is a side elevation partly in section taken on line 6—6 of Fig. 5, showing one member of said tile reposing on a pallet or bed, illustrating the position in which the members are molded and cured.

Fig. 7 is a plan view of a corner tile and is in the nature of a modification of the tile shown in Figs. 1, 2, 3 and 4.

Fig. 8 is a side elevation view of Fig. 7.

Figure 1:
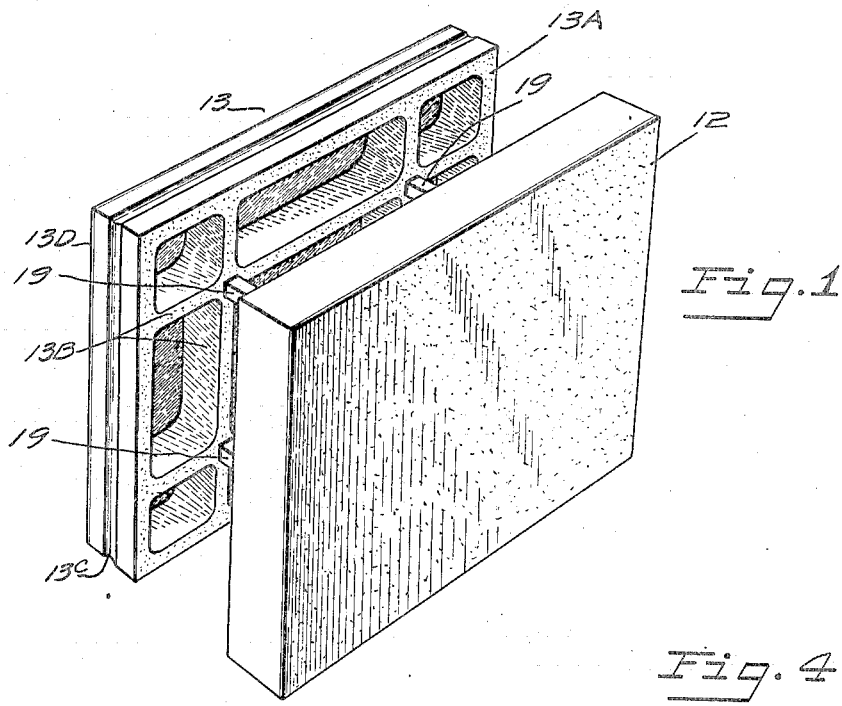
Fig. 1 is a perspective view of one of my improved tile.
Figure 2:
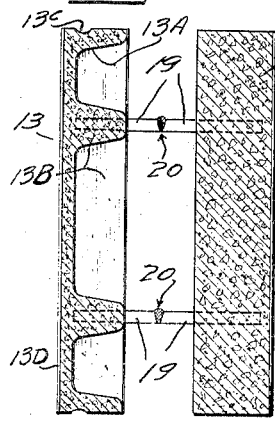
Fig. 2 is a vertical cross-sectional view therethrough showing one member of the unit with a substantially flat inner face, and the opposite member thereof with its inner face recessed and with marginal flanges and ribs.
Figure 3:
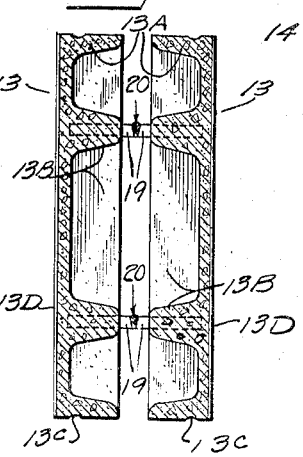
Fig. 3 is a similar vertical cross-sectional view showing a modification of said tile with both inner faces of the members of the unit recessed and with marginal flanges and ribs.
Figure 4:
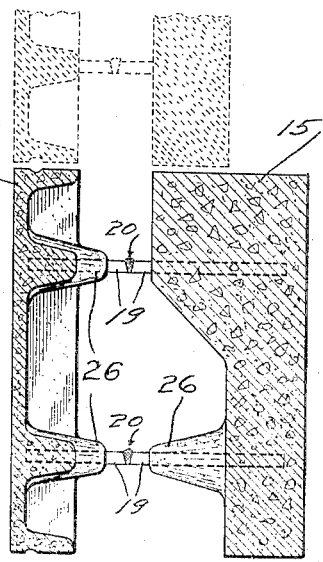
Fig. 4 is another similar vertical cross-sectional view showing a wall reducing unit, another modification of said tile, one member of the unit having its inner faces recessed and having marginal flanges, ribs and bosses, and the opposite member having bosses projecting from its inner face. The fine broken lines above indicating an adjacent tile, illustrates the purpose of this reducing unit.

Fig. 9 is a plan view of a silo or circular wall unit which is another modification of the tile shown in Figs. 1, 2, 3 and 4, the members of the unit having their inner faces recessed and having marginal flanges and ribs, the faces of the unit being curved in a horizontal plane, with grooves in the horizontal flanges of the inner member thereof for the purpose of installing reinforcing bars or hoops.

Fig. 10 is a vertical cross-sectional view thereof taken on line 10—10, of Fig. 9, the fine broken lines indicating adjacent tile, illustrate the purpose of the aforesaid grooves in the horizontal flanges of the inner member.

Fig. 11 is an elevation view taken on line 11—11 of Fig. 9, showing the inner face of the inner member of the unit.

Similar reference numbers designate similar parts throughout the several views.

In the embodiment of the invention illustrated in the drawings, the tile comprises two or more sections 12, 13, 14, 15, 16, 17, 18, 22 and 23 formed of cementitious or argillaceous material. The inner surface may be recessed and in Figs. 1–3 the section 13 is shown as having marginal flanges 13^A and ribs 13^B. Grooves 13^C are also formed around its edges.

These sections 12, 13, 14, 15, 16, 17, 18, 22 and 23 are molded preferably on concrete beds in a prone position as illustrated in Fig. 6. Each section has embedded therein and projecting therefrom a plurality of metal bars 19. The bars 19 are positioned in the mold before the slab material is introduced, as shown at 21, Fig. 6. The bars in the section 13 are placed at the intersection of the ribs 13^B, and in Fig. 4 they are in the bosses 26. Neither of these constructions is essential and in the section 16, Fig. 5, they are shown differently.

It will be noted that the bars 19 of one section are disposed end to end with the bars of another section, when the sections are placed in spaced relation, as shown at Figs. 1, 2, 3, 4, 7, 8, 9 and 10.

When the sections are hard enough to be removed from the beds or pallets, they are stored and cured in the usual manner, then positioned with their outer surfaces in desired spaced relation as shown at Figs. 1, 2, 3, 4, 7, 8, 9 and 10, and with the free ends of the bars 19 disposed end to end. Then the corresponding bars 19 are permanently united into continuous one-piece tie-rods, as by soldering, brazing, fusing or electrically welding, to form a solid joint as shown at 20. Thus the finished tile of this invention is completed.

Figs. 9, 10 and 11 show views of a segmental tile for use in the construction of silos or other structures with circular walls. The grooves 24 Fig. 10 are for the purpose of tieing together the tile in a circular wall to resist internal pressure from the contents of the structure, by means of installing continuous tie-rods 25 Fig. 10 in the grooves 24 and embedding them in mortar, as the courses of the wall are erected.

It will be noted that both walls of the building unit are molded with their outer faces upward and exposed in the molds, thus facilitating inspection, surface treatment and monolithic veneering. The surface coating is designated by 13^D, Figs. 1–3.

Although several specific embodiments of the invention have been particularly shown and described, it will be understood that the invention is capable of other modifications, and that changes in the construction and in the arrangement of the flanges, ribs, tie-rods and tie-rod bosses may be made without departing from the spirit or scope of the invention, as expressed in the claims.

The tile and method shown, described and claimed in this application were disclosed and claimed in an application, Serial No. 735,762, filed by me on September 4, 1924, of which this application is a continuation in part and which is superseded by this application. The feature of finishing both outer surfaces of the tile while in a horizontal position during the process of molding, and also the feature of the grooved edges of the tile are disclosed in a co-pending application, Serial No. 735,761, which I also filed on September 4, 1924. In this application further developments on the tile are disclosed.

The combining of separately molded cementitious members into a self-contained unitary hollow wall tile is a new art in the manufacture of cement products and the resultant product serves many new and useful purposes in building construction. It is to be understood that in the claims the word "cementitious" is used to define broadly any suitable plastic material, and that the word "welds" and "welding" are also used broadly to cover any solid unbroken connection between the rods 19, or any method of making such connection.

What I claim is:

1. A wall building unit comprising members held in predetermined relation by tie-rods embedded respectively in said members, the abutting ends of said tie-rods being solidly united to form rigid one-piece connections between said members.

2. A rigid hollow wall building unit comprising separately molded members permanently spaced in opposed relation by a plurality of metallic tie-rods embedded in the inner opposing faces of said members and oppositely disposed in pairs, the abutting ends of said tie-rods being solidly united to form rigid one-piece connections between said members.

3. A rigid hollow wall building unit, comprising separately molded members permanently spaced in opposed relation by a plurality of metallic tie-rods embedded in the inner opposing faces of said members and oppositely disposed in pairs, the abutting ends of said tie-rods being solidly united to form rigid one-piece connections between said members, the inner opposing faces of said members being provided with a plurality of reinforcing bosses projecting laterally therefrom, said tie-rods entering the members through the apices of the bosses.

4. A rigid hollow wall building unit comprising separately molded members permanently spaced in opposed relation by a plurality of metallic tie-rods embedded in the inner opposed faces of said members and oppositely disposed in pairs, the abutting ends of said tie-rods being solidly united to form rigid one-piece connections between said members, the inner opposed faces of said members having recesses formed by continuous marginal flanges and transverse ribs.

In witness whereof, I have hereunto set my hand this 7th day of July, 1925.

HARDY BOWLES.